United States Patent [19]
Burke et al.

[11] Patent Number: 5,406,643
[45] Date of Patent: Apr. 11, 1995

[54] METHOD AND APPARATUS FOR SELECTING BETWEEN A PLURALITY OF COMMUNICATION PATHS

[75] Inventors: Christopher J. Burke, Maple Valley; Janice M. Chaffee, Auburn; Erez Nir, Bellevue; Thomas E. Kee, Lynnwood, all of Wash.

[73] Assignee: Motorola, Inc., Schaumburg, Ill.

[21] Appl. No.: 991,892

[22] Filed: Feb. 11, 1993

[51] Int. Cl.[6] .......................... H04Q 11/04; H04J 3/26
[52] U.S. Cl. .................................... 395/200; 370/94.1; 364/DIG. 1; 364/284; 364/284.3; 364/284.4; 364/242.94; 364/229; 364/229.3; 364/229.4; 364/229.5
[58] Field of Search .............. 395/200, 700, 650, 800; 370/94, 94.1, 94.3, 60.1

[56] References Cited
U.S. PATENT DOCUMENTS

| | | | |
|---|---|---|---|
| 4,736,363 | 4/1988 | Aubin et al. | 370/60 |
| 4,825,206 | 4/1989 | Brice, Jr. et al. | 340/825.02 |
| 5,088,032 | 2/1992 | Bosack | 395/200 |
| 5,115,495 | 5/1992 | Tsuchiya et al. | 395/200 |
| 5,142,622 | 8/1992 | Owens | 395/200 |
| 5,168,572 | 12/1992 | Perkins | 395/800 |

*Primary Examiner*—Kevin A. Kriess
*Attorney, Agent, or Firm*—Val Jean F. Hillman

[57] ABSTRACT

In a data communication system (100), a method is provided to distinguish between and select from multiple communication paths (4,6,and 8)to a designated end point (10). The communications path selection is done locally, on a portable subscriber unit (2). The communications path is transparent to requesting software application (30). The method manages a plurality of communications devices (42,44) using existing communications infrastructure.

19 Claims, 9 Drawing Sheets

METHOD AND APPARATUS FOR SELECTING BETWEEN A PLURALITY OF COMMUNICATION PATHS

RELATED INVENTION

The present invention is related to the following inventions:

(1) "Message Routing And Destination Selection", having Ser. No. 771708, filed Oct. 4th, 1991, and assigned to the assignee of the present invention.

(2) "Simultaneous Control Of A Communications Channel In A Multi-Tasking System", having Ser. No. 876662, filed on Apr. 30th, 1992, and assigned to the assignee of the present invention.

(3) "Method of Data Communication For Radio Frequency Modems Requiring Different Communications Protocols", having Ser. No. 876644, filed Apr. 30th, 1992, and assigned to the assignee of the present invention.

(4) "Method For Asynchronous Application Communication", having Ser. No. 876889, filed Apr. 30th, 1992, and assigned to the assignee of the present invention.

TECHNICAL FIELD

This invention relates generally to data communication and, in particular, to a method for distinguishing between a plurality of communication paths and selecting from those a communications path for use.

BACKGROUND OF THE INVENTION

Data and voice communications technologies have advanced rapidly in recent years, leading to the immergence of different and typically incompatible communication systems, such as paging, cellular, telephone data, and radio packet data. Initially, the users of such systems accepted their inherent incompatibility. The modern trend, however, is for system users to expect and demand higher levels of compatibility between and interconnection to the currently available communications platforms. Thus, a cellular radiotelephone communication system must interconnect with the land-line telephone system, and wireless LAN (local area network) systems must now operate as extensions of wired LANs in order to achieve and sustain commercial viability.

In response to this pressure, manufacturers of communication-capable portable and fixed devices, such as personal organizers and laptop computers, are beginning to incorporate multiple communication technologies into their products. It is anticipated that the device user will learn to view the different technologies as merely alternatives for performing the same type of operation.

As the level of systems interoperability increases, the differences between the various communications technologies, hereinafter referred to as media or medium, will become less important. Ultimately, it is anticipated that user involvement in the selection process will diminish to a point where the user may not even know which media is being used at any given instant.

To achieve this end, there is need for a method for enabling a portable subscriber unit to automatically select one of a plurality of available communications media based at least partly upon its knowledge of potential communication paths. A need also exists for a data communications method that creates, for different software applications, a common interface to communications systems which typically employ incompatible communications protocols.

Current techniques for providing communications media selection suggest routing all such inquiries to a central host for processing. Selection of the appropriate media is performed by the central host, whose decision may or may not be returned to the requesting device. As is appreciated, this process necessitates transmitting request traffic over a communications network. Such message traffic can significantly impact overall system throughput. Moreover, the centralized control of communications media selection may result in overloading during periods of high volume. Such systems typically require infrastructure upgrades and modifications in order to provide the requisite centralized control.

It would be extremely advantageous therefore to provide a method and apparatus whereby a portable subscriber unit automatically selects one of a plurality of available communications media based on knowledge of the available communication paths.

SUMMARY OF THE INVENTION

Briefly described, the present invention is a method and apparatus for permitting a subscriber unit to select from amongst a plurality of communications media, that particular media for establishing a communications path to a specified end point. According to one aspect of the invention, the method for permitting a subscriber unit having memory and communication resources to select one of a plurality communications paths to a designated destination comprises the steps of: storing in memory a list of communication paths having associated attributes; receiving a connection command comprising destination and communications criteria; selecting from the list, at least one communications path, as a function of destination; and establishing a connection to the selected communications path.

A preferred embodiment of the present invention comprises a packet server module and at least one device manager module, wherein a number of software application programs request data communications by interfacing to the packet server. The packet server maintains a session list identifying currently available connections (virtual links) to a specific end point, and selects a communications path based at least partly upon knowledge of the destination. The device manager maintains a list specifying the possible communications paths to specific end points and actually controls the communications resources responsible for establishing a communications path.

DETAILED DESCRIPTION OF A PREFERRED EMBODIMENT

The present invention has application to data communications between personal computers and personal communicating devices. The data communications method provides a scheme for identifying a desired remote point of contact or end point, regardless of the devices or networks needed to support such communications.

Figure 1:
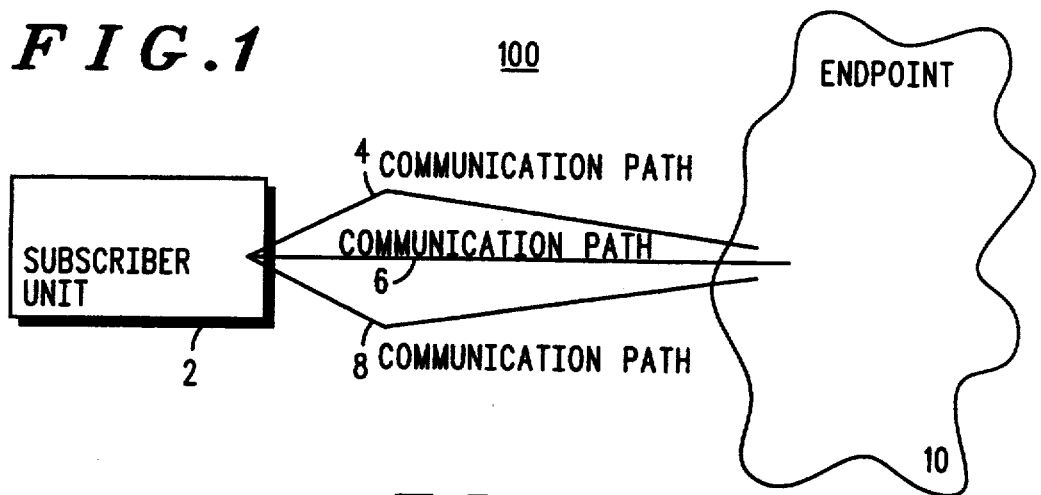
FIG. 1 depicts a subscriber unit in communication with an end point through one of a plurality of communication paths.

FIG. 1 depicts a subscriber unit 2 communicating with an end point 10 through one of a plurality of communications paths 4, 6, and 8. Subscriber unit 2 is a communicating computer as described in detail below. End point 10 is any well-known destination to which the subscriber unit 2 wishes to connect, such as an Electronic mail system, electronic database, communications network, or another subscriber unit. Communication paths 4, 6, and 8 represent the set of available communication paths from the subscriber unit 2 to the desired end point 10. Communications paths 4, 6, and 8 may consist of wireless or wireline communications media such as, but not limited to, telephone lines, twisted pair wire, fiber-optic links, infrared channels, and radio frequency channels.

Figure 2:
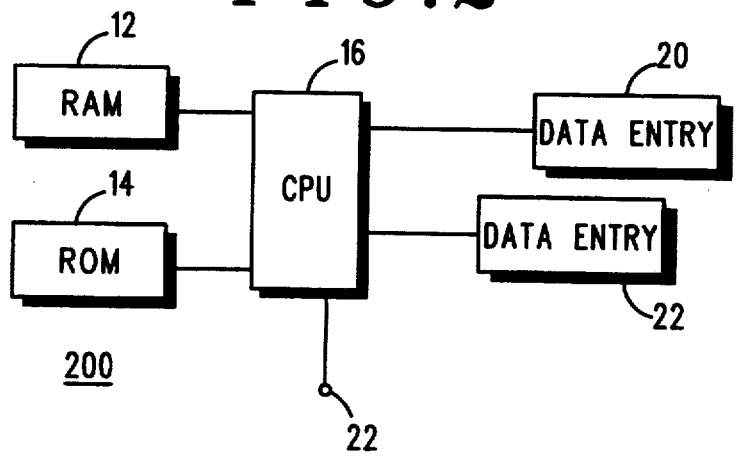
FIG. 2 is a block diagram of a data processing unit employed by the subscriber unit of FIG. 1.

FIG. 2 depicts a block diagram of a data processing unit 200 employed by the subscriber of FIG. 1 in order to provide communications in accordance with the present invention. The data processing unit 200 comprises a central processing unit (CPU) 16, random access memory (RAM) 12, read only memory (ROM) 14, data entry device 20, display 22, and input/output (I/O) terminal 18.

The CPU 16 with associated memory may be realized using a conventional microprocessor such as an MC68HC11 microprocessor which has in the past been from Motorla Inc. As will be appreciated, the CPU 16 operates under control of an supervisory control program (Operating System) partially or wholly contained in ROM 14 and utilizing RAM 12, to control in bound and out bound data traffic on terminal 18 and to perform all tasks as initiated by the user, via data entry device 20.

Data entry device 20 may comprise any of the well known data entry devices currently available which permit a system user to enter data and commands. Such devices include, but are not limited to, alphanumeric keys, touch screens, pressure or light sensitive pens, graphic user interfaces, computerized information presentation systems, and voice activation schemes.

In order to present information in a human perceivable form, the data processing unit 200 employs a display unit 22. This display unit is selectable from, but not limited to any of the well-known visual display devices comprising CRT displays, LCD displays, LED displays and/or television monitors.

In accordance with the present invention, data and control information are communicated between the processing unit 200 and media communications equipment (not shown), such as an infrared transceivers, fiberoptic transceivers, wire-line modems, and/or RF modems via I/O terminal 18. The communications equipment connected to I/O terminal 18 enables the subscriber unit 2 of FIG. 1 to communicate over the communication paths 4, 6, and 8 (FIG. 1).

It will be appreciated by those skilled in the art that the structure of the processing unit 200 is presented as a preferred embodiment. The present invention, as hereinafter disclosed, will continue to operate as described, despite modifications to the processing unit 20 such as, for example, the deletion of data entry device 200 or display unit 22.

Figure 3:
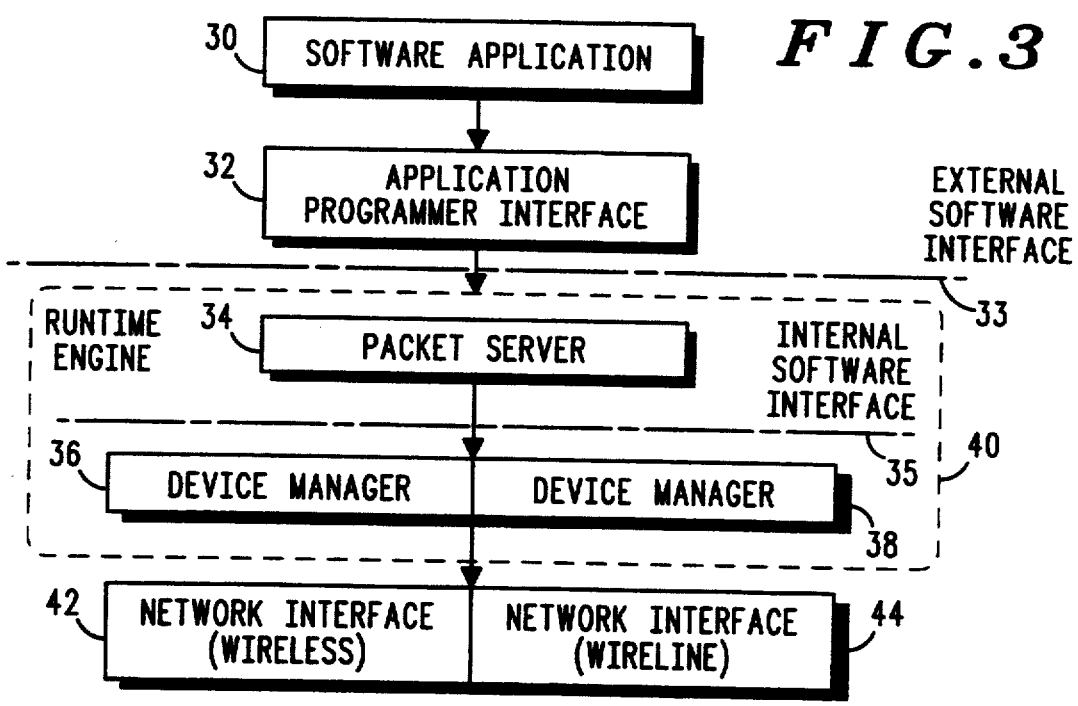
FIG. 3 is a functional block diagram of the control software used by the data processing unit of FIG. 2 during data communications.

FIG. 3 is a functional block diagram of control software used by the data processing unit 200 of FIG. 2 during data communications in accordance with the present invention. The control software, hereinafter referred to as runtime engine 40, comprises functional blocks including packet server 34 and device managers 36 and 38.

External software for use with the runtime engine 40 comprises application software 30 and application programmer interface software (API) 32. Application software 30 comprises any computer software program wishing to communicate data in accordance with the present invention. API 32 is a library of communication routines which are called by application software 30 and allow programs written in a specific program language to access a communications device (not shown) through a predetermined set of function calls and network interface device 42,44. In a preferred embodiment the set of library functions comprise functions such as, but not limited to, open_session, close_session, get_message, send_message, get_number_message, get_notification_configuration, set_notification_configuration, and get_number_messages. One or more pairings of application software 30 instructions and API 32 routines may interface to packet server 34 through the external software interface 33 as delimited by runtime engine 40.

Runtime engine 40 provides a uniform abstraction of available communication systems by providing a standard set of data communication commands for application software 30, which is independent of the computer programming language utilized by application software 30, or the ultimate path selected. During operation, API 32 library calls are routed to packet server 34, which passes requests from one or more application software programs 30 to one or more device managers 36 and 38. Thus, API 32 operates to provide a standard mapping of the specific computer programming language in which application software 30 is implemented into messages that can be passed to the packet server 34.

Packet server 34 operates to manage a list of sessions. A session is a record representing the information required by packet server 34 to interact with device managers 36 and 38 and a specific software application program 30. Device managers 36 and 38 control the wireless and or wireline communications equipment handling requests from packet server 34 on behalf of application software 30. Device manager 36 and 38 manage path prototypes and data links as described below. A path prototype is a record representing a potential physical path to a designated end point. A data link is a record that represents an actual physical link to a previously specified end point.

Device managers 36 and 38 are independent executables that interface to packet server 34 via an internal software interface 35 and also interface directly to the communications equipment (not shown) via wireless or wireline network interface devices 42 and 44. As will be appreciated, a single device manager can communicate with one or more network interfaces 42 and 44. Each network interface provides the necessary registers and line drivers for communicating with the communications equipment and will typically include a CPU, RAM, and ROM if these resources are not available in the communications equipment. In accordance with the present invention, any number of device managers can communicate with packet server 34.

Figure 4:
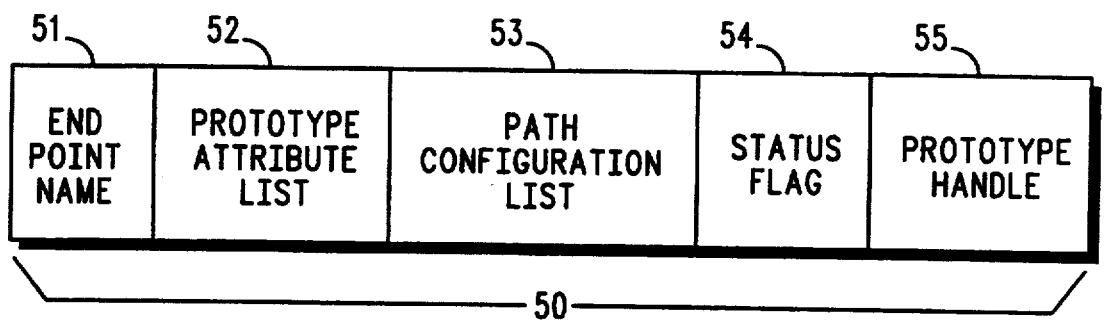
FIG. 4 depicts the structure of a communications path prototype (CPP) record in accordance with the present invention.

FIG. 4 depicts the structure a communications path prototype (CPP) record in accordance with the present invention. CPP records 50 are maintained within a list in device managers 36 and 38, respectively, and define a potential path to a designated end point 10. As shown, each CPP record 50 comprises an END POINT NAME field 51, ATTRIBUTE LIST 52, CONFIGURATION LIST 53, STATUS FLAG 54, and PROTOTYPE HANDLE field 55. In accordance with the present invention, each CPP record 50 is used to establish a link in order to send data packets between application software programs 30 of FIG. 3 and an end point 10 of FIG. 1.

The disclosed record structure contains destination information, predefined communications path attributes, communication device commands, status and ID. END POINT NAME field 51 designates a specific remote message source or destination. Packet server 34 can select a subset of all CPP records maintained within device managers 36 and 38 by using END POINT NAME field 51 as a selection criteria. This allows packet server 34 to identify those CPP records 50, herein also referred to as prototypes, which define diverse physical paths to a designated end point 10.

ATTRIBUTE LIST 52 is a list of pairs in the form (name, information) that describes the characteristics of a single actual communications path. Examples of specific prototype attributes are (name=DIRECTIONALITY, information=TWO-WAY), or (name=-BAUD, information=4800). The packet server 34 can select individual attributes from ATTRIBUTE LIST 52 by using the value of "name" as a selection criterion. This allows packet server 34 to compare the "information" field of a selected attribute against a value known to the packet server.

CONFIGURATION LIST 53 contains information for automatically configuring communication equipment to establish a communication path to a source or destination specified by END POINT NAME field 51, whereby the communication path has the characteristics identified in ATTRIBUTE LIST 52.

STATUS FLAG field 54 contains a value indicating whether a CPP record 50 has an associated data link 60 as described herein and below. When STATUS FLAG 54 indicates the existence of a data link 60, the creation of a new data link using the present CPP record 50 is inhibited.

PROTOTYPE HANDLE Field 55 is a secondary search key whereby packet server 34 can identify and select a specific CPP record 50 from the list maintained by a device manager 36 or 38.

Figure 5:
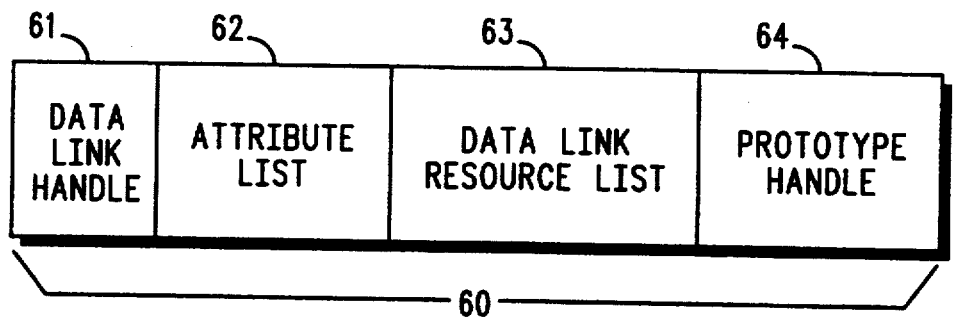
FIG. 5 depicts the structure of a data link record in accordance with the present invention.

FIG. 5 depicts the structure of a data link record in accordance with the present invention. Data link records 60 are maintained within the device managers 36 and 38 and define a physical path to a designated end point 10. Device manager 36 maintains the list of data links, indicating at any given time the open connections to end points for a given device manager 36 or 38.

As shown, the record structure consists of DATA LINK HANDLE field 61, ATTRIBUTE LIST 62, DATA LINK RESOURCE LIST 63 and PROTOTYPE HANDLE field 64. DATA LINK HANDLE field 61 is the primary search key, by which packet server 34 can select a given data link from a list of data links maintained by device managers 36 and 38. ATTRIBUTE LIST 62 is a list of pairs of the form (name, information) describing characteristics of the actual communication path represented by this data link, and similar to PROTOTYPE ATTRIBUTE LIST 52 of FIG. 4. DATA LINK RESOURCE LIST 63 is a list of parameters describing to device manager 36 or 38 how to automatically operate communication equipment associated with data link 60. PROTOTYPE HANDLE 64 is a reference for a data link 60 to locate its associated CPP record 50 of FIG. 4 for the purpose of updating the STATUS FLAG field 54 of CPP record 50.

Figure 6:
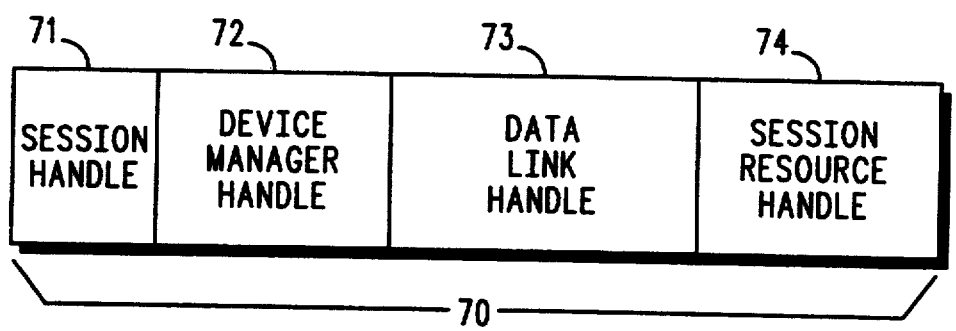
FIG. 6 depicts the structure of a session in accordance with the present invention.

FIG. 6 depicts the structure of a session in accordance with the present invention. Sessions 70 are maintained within a list in packet server 34 and comprise the information required by the packet server 34 to interact with a data link 60 found within a device manager 36 or 38.

Each session 70 consists of a SESSION HANDLE 71, DEVICE MANAGER HANDLE 72, DATA LINK HANDLE 73 and SESSION RESOURCE LIST 74. SESSION HANDLE 71 is the primary search key, allowing software application programs 30 of FIG. 3 to select a particular session from a list of sessions maintained by packet server 34. DEVICE MANAGER HANDLE 72 provides a unique identifier for packet server 34 to select one device manager from a plurality of device managers 36 and 38. DATA LINK HANDLE 73 enables the packet server 34 to access a specific data link 60 from the data link list maintained by the associated device manager 36, specifically identified by the value of DEVICE MANAGER HANDLE 72. SESSION RESOURCE LIST 74 is a list of parameters specifying for packet server 34 how to interact with the selected device manager 36. Specifically, SESSION RESOURCE LIST 73 instructs how to perform communications on behalf of applications software 30 over the actual communications path associated with data link 60 as identified by the present session 70.

Figure 7:
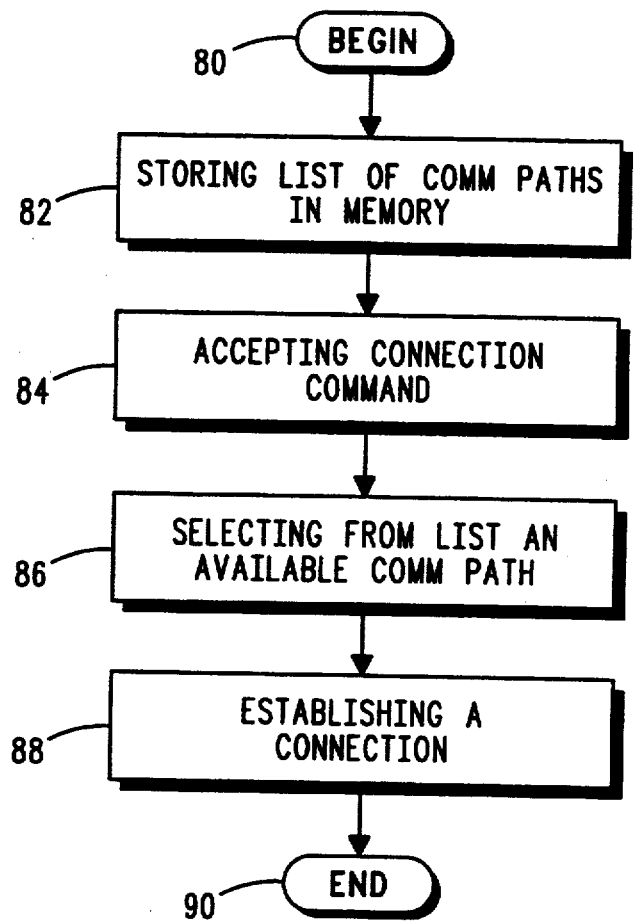
FIG. 7 is a flow chart diagram depicting the steps performed by the data processing unit of FIG. 2 under direction of the control software of FIG. 3 during communications path selection in accordance with the present invention.

FIG. 7 is a flow chart diagram depicting the steps performed by the data processing unit of FIG. 2 under direction of the control software of FIG. 3 during communications path selection in accordance with the present invention. Commencing with begin block 80, flow proceeds to block 82 where a list of communication paths are stored in memory. This step corresponds to storing and maintaining prototypes (CPP records 50) within device managers 36 and 38. From block 82, flow proceeds to block 84 where the packet server 34 of FIG. 3 receives a connection command from software application 30 via API 32. This command contains destination information, i.e., END POINT NAME, and various communication criteria as established and desired by software application 30. Such criteria specify acceptable ranges of values for various communication attributes such as, for example, "transfer cost" must be less than $1.00 per kilobyte or "directionality" must be two-way.

Flow proceeds from block 84 to block 86 where packet server 34 selects from said list at least one available communications path based as a function of destination. In this effort, the packet server 34 requests from device managers 36 and 38 all prototypes which have an END POINT NAME field 51 comprising information which corresponds to the destination information found within the connection command at block 82. Based upon receipt these prototypes, packet server 34 may select a communication path. In accordance with another aspect of the present invention, packet server 34 can further delimit selection of a communications path based upon a comparison of the communications criteria in the communications command and the communication path attributes as maintained in CPP records 50.

From block 88, flow proceeds to block 90 where packet server 34 establishes the communication path connection in preparation for transmission of information between software application 30 of FIG. 3 and end point 10 of FIG. 1.

Figure 8:
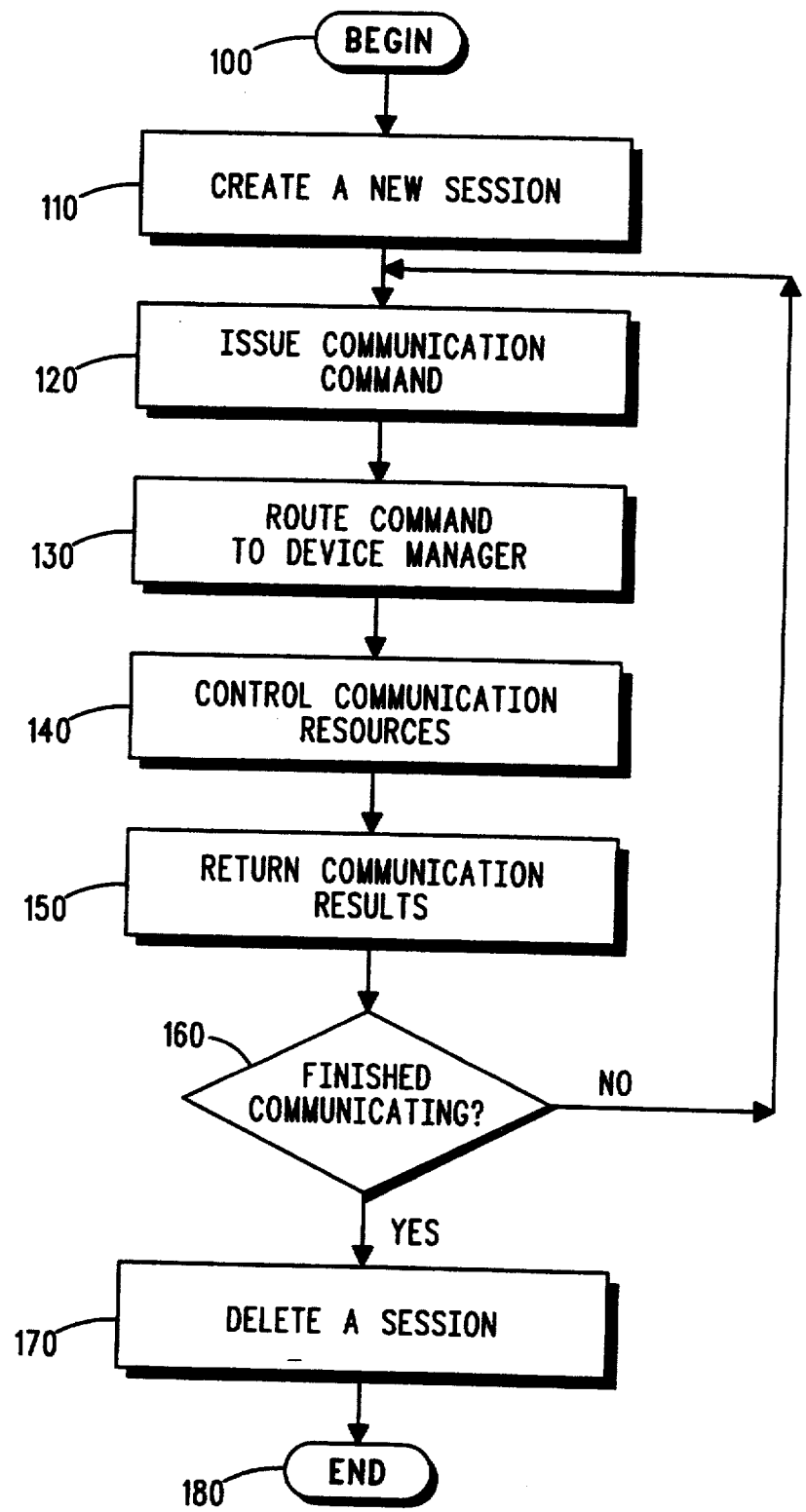
FIG. 8 is a flow chart diagram depicting the steps performed by the data processing unit of FIG. 2 under direction of the control software of FIG. 3 during data communications in accordance with the present invention.

FIG. 8 is a flow chart diagram of the steps performed by processing unit 200 of FIG. 2 under directions from the control software depicted in FIG. 3 during data communications in accordance with the present invention. Commencing with begin block 100 when a subscriber unit 2 requests communications with an end point 10, flow proceeds to block 110 where the processing unit 200 creates a session 70. In accordance with a preferred embodiment of the present invention, at least one of the potential communications paths 4, 6, and 8, is selected as a function of destination. Such selection may further be qualified by criteria specified by software application 30. The creation of a new session is described in more detail below.

When a session 70 has been successfully established, data communication can occur. Thus at block 120 a communications command is issued specifying the type of communication, i.e. send, receive, etc., communication parameters, i.e. data buffers, etc., and a session reference identifying a session 70 over which the communication is to occur. At block 130, packet server 34 routes the communication command 130 and the identified session's DATA LINK HANDLE 73 to the appropriate device manager 36 or 38 using the session's DEVICE MANAGER HANDLE 72 of FIG.6.

At block 140 the appropriate device manager 36 issues the proper control sequence to the communications equipment in accordance with the DATA LINK RESOURCE LIST 63 of the specific data link 60 of FIG. 5, as identified by DATA LINK HANDLE 73, allowing the data transfer to occur over the pre-selected communications path. At block 150 the appropriate device manager returns the results of the communication to the software applications 30 via packet server 34.

At decision block 160 a test is performed to determine whether communications is complete. If software applications 30 is finished communicating, the session 70 is deleted 170. The session deletion process is described below in more detail. If software applications 30 is not finished communicating, then flow returns to block 120 to issue another communications command.

Figure 9:
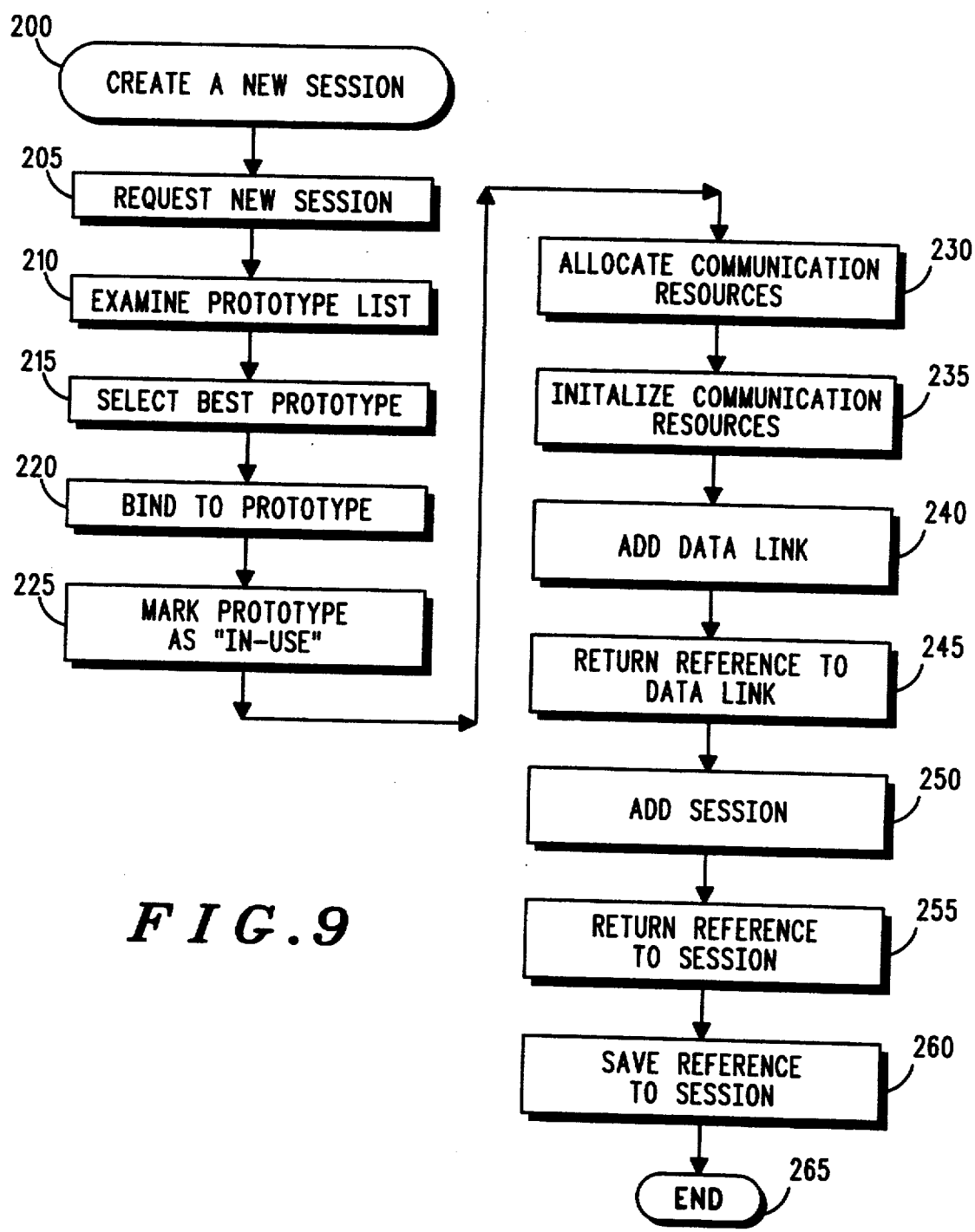
FIG. 9 is a flow chart diagram depicting the steps performed by the data processing unit of FIG. 2 under direction of the control software of FIG. 3 during the creation of a session in accordance with FIG. 8.

FIG. 9 is a flow chart diagram depicting the steps performed by the processing unit 200 of FIG. 2 under directions from the control software depicted in FIG. 3 during session creation in accordance with the present invention. To create a new session, software applications 30 issues a request 205 to packet server 34 for a new session, specifying communication criteria and an end point name 10 with which the subscriber unit 2 wishes to communicate. The communication criteria are various attributes desired by software application 30 for the new session, such as baud rate, packet size, transit time, transfer cost, carrier ID, directionality, end point name, channel ID, etc.

Packet server 34 requests from all device managers 36, 38 CPP records 50 (prototypes) with the designated value of END POINT NAME 51 corresponding to end point 10. Each device manager 36, 38 publishes only those prototypes having the specified value of END POINT NAME 51 and having the value AVAILABLE for STATUS FLAG 54. Packet server 34 examines at block 210, the resultant prototype list and selects at least one prototype at block 215 based upon the matched destination information and further in light of the communication criteria specified within the new session request.

The remainder of this description assumes that the "best match" prototype was published by device manager 36, although, in the alternative, it could have been published by device manager. Packet server 34 requests a "binding" at block 220 to the selected "best match" prototype from the prototype's device manager 36, passing to device manager 36 a binding request including the value of the "best match" prototype's PROTOTYPE HANDLE 55.

Device manager 36 sets the value of STATUS FLAG 54 of the "best match" prototype to IN-USE at block 225. Next, device manager 36 allocates and initializes the required communication resources, specified by the "best match" prototype's PATH CONFIGURATION LIST 53 at blocks 230 and 235. At block 240, the device manager 36 adds a data link 60, representative of the actual communication path now allocated, and copies the value of the "best match" prototype's PROTOTYPE HANDLE 55 to the PROTOTYPE HANDLE 64 field of data link 60. At block 245, the device manager 36 returns a data link reference to packet server 34 for inclusion into the session's DATA LINK HANDLE 73 field.

At block 250, the session is added to the packet server's session list. A reference to the session is returned at block 255 to software application 30 for use in future communication related commands over that session's communication path. Software application 30 saves the session reference 260.

Figure 10:
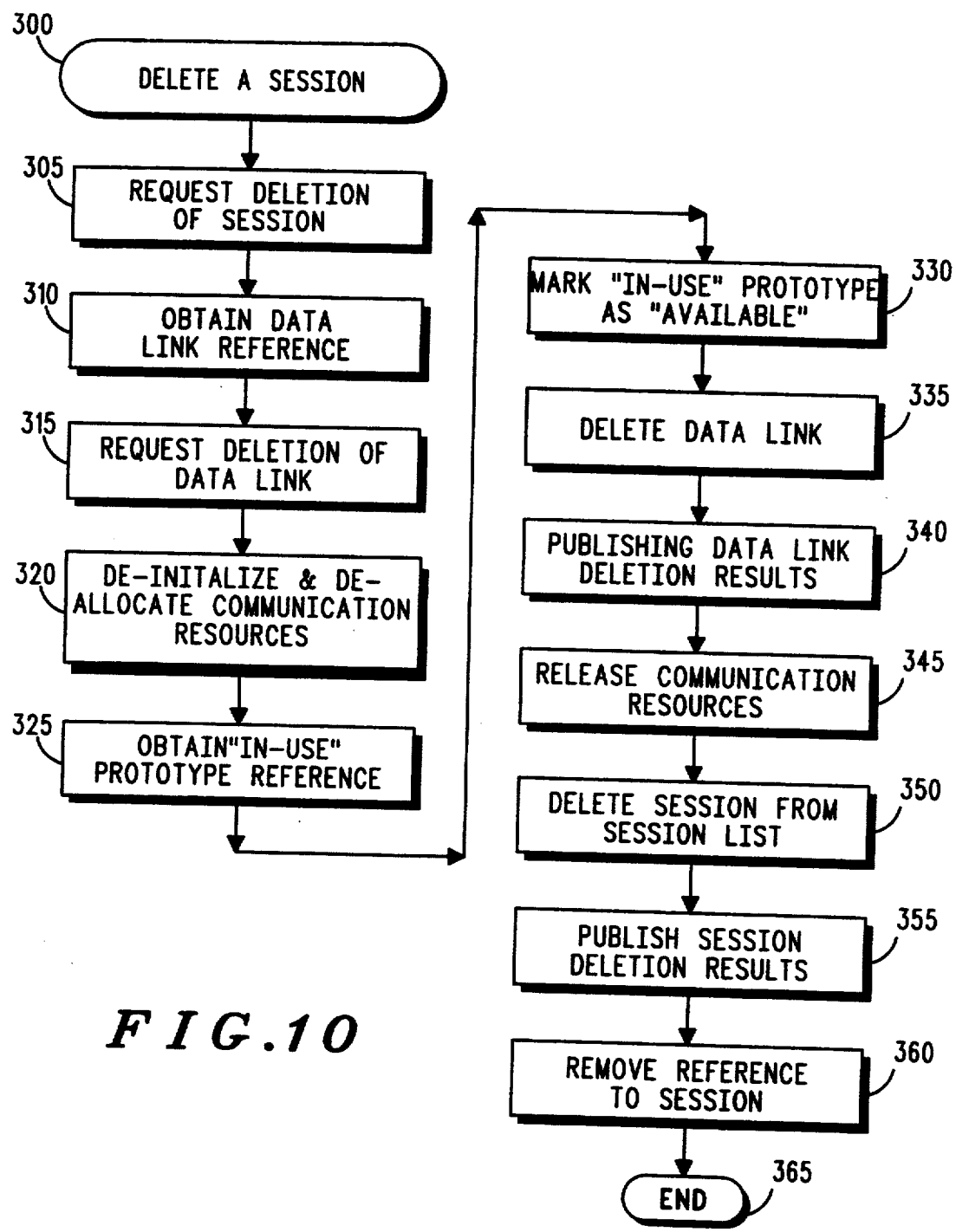
FIG. 10 is a flow chart diagram depicting the steps performed by the data processing unit of FIG. 2 under direction of the control software of FIG. 3 during the deletion of a session in accordance with FIG. 8.

FIG. 10 is a flow chart diagram depicting session deletion in accordance with a preferred embodiment of the invention. To delete a session 300 from packet server's 34 session list, a request 305 specifying a session reference is issued from applications software 30 when communication over that session's path is no longer required. Packet server 34 obtains a data link reference 310 from the specified session's DATA LINK HANDLE field 73.

Packet server 34 issues a request 315 to the specific device manager 36, 38, identified by the session's DEVICE MANAGER HANDLE 72 field, to delete the data link specified by DATA LINK HANDLE 73. Device manager 36 relinquishes communication resources 320 associated with the specified data link. Device manager 36 obtains the reference for the IN-USE prototype 325 associated with the data link specified by packet server 34. The IN-USE prototype is marked as AVAILABLE 330 by device manager 36.

Device manager 36 deletes the specified data link 335 from its data link list. Device manager 36 notifies packet server 34 of the results of the data link deletion 340. Packet server 34 releases communication resources 345 used for the session to be deleted. Packet server 34 deletes the specified session from its session list 350. Packet server 34 publishes results of session deletion 355 to requesting client application 30. Client application 30 removes its reference to the deleted session 360.

Figure 11:
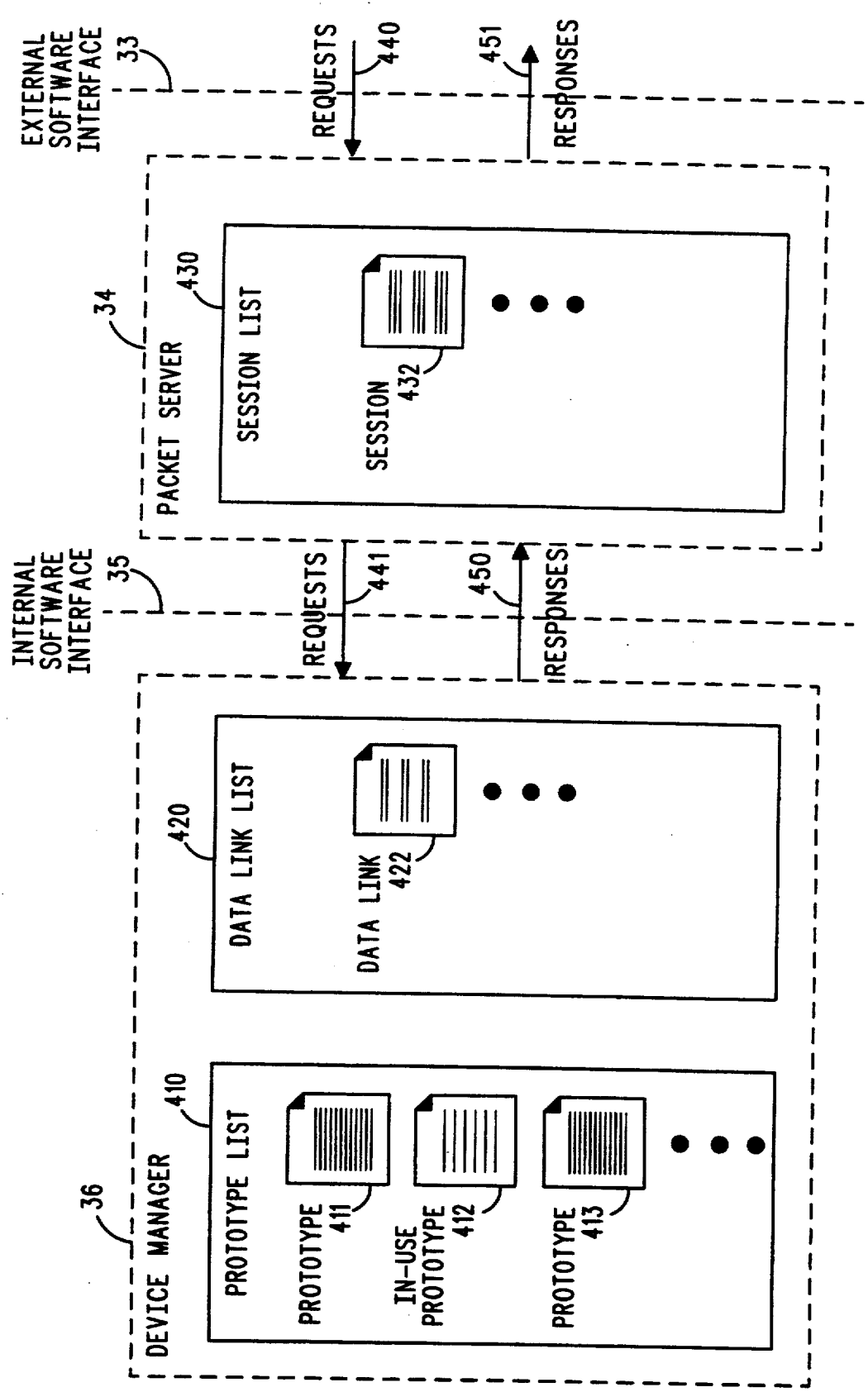
FIG. 11 comprises an architecture diagram of a preferred embodiment of the present invention in a representative initial state.
Figure 12:
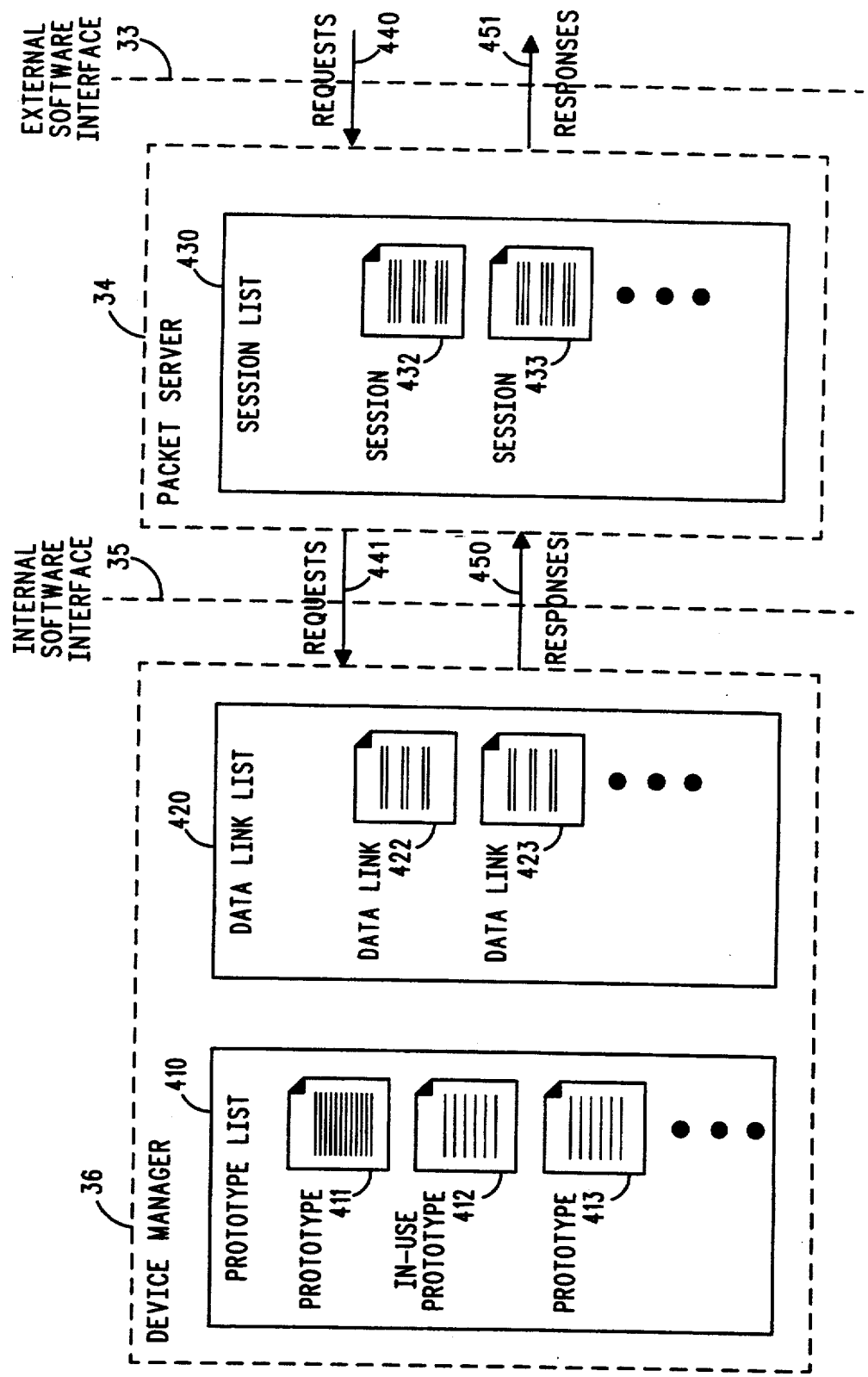
FIG. 12 comprises an architecture diagram of a preferred embodiment of the present invention depicting the creation of a session.
Figure 13:
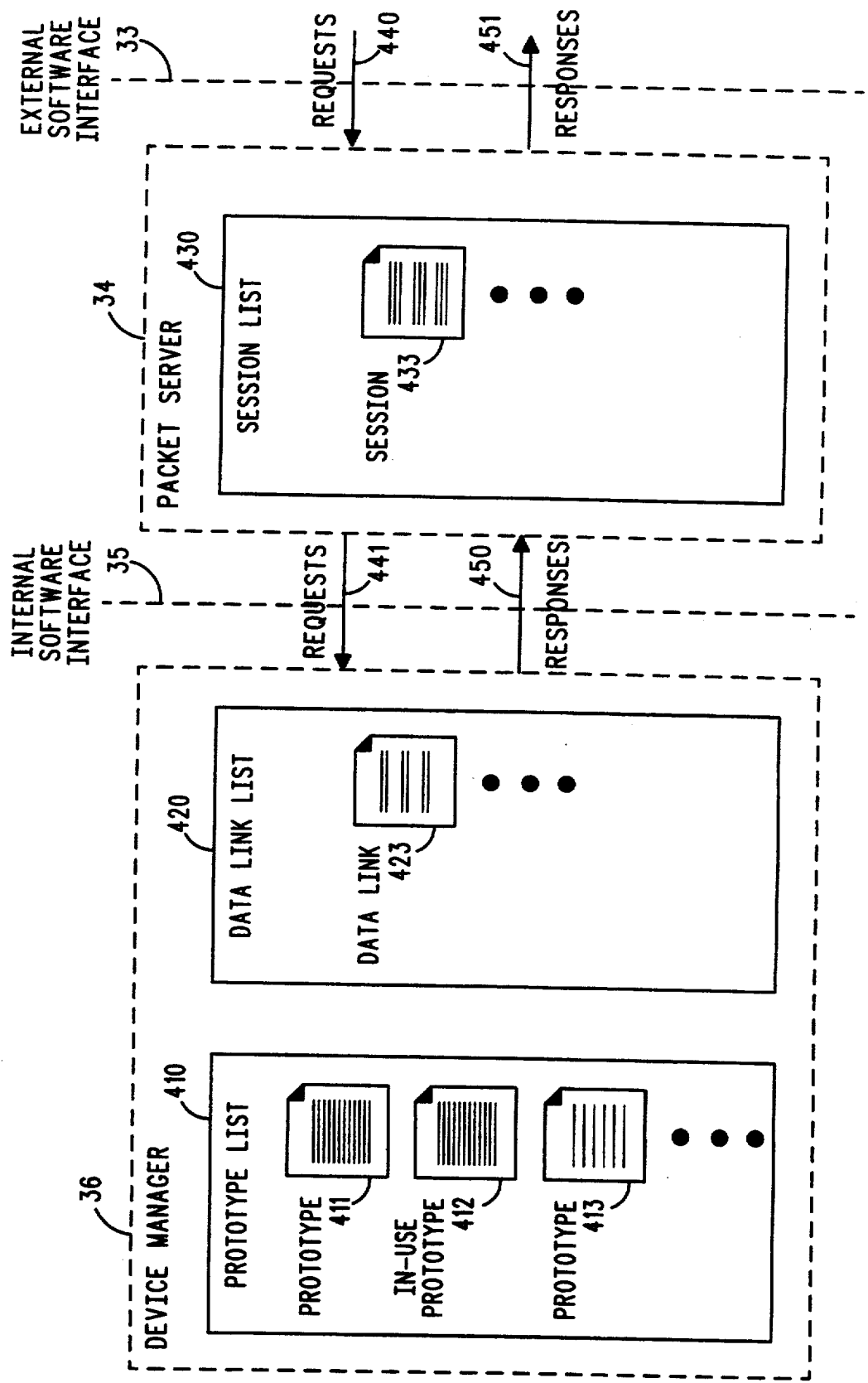
FIG. 13 comprises an architecture diagram of a preferred embodiment of the present invention depicting termination of the session created in FIG. 12.

With reference now to FIGS. 11-13, the operation of a preferred embodiment of the invention will be described. FIG. 11 comprises an architecture diagram of a preferred embodiment of the present invention in a representative initial state. The initial state shows an existing session 432 in session list 430 and an associated data link 422 in data link list 420. Session 432 and data link 422 are using prototype 412 to characterize the communications path.

Referring next to FIG. 12, which depicts an architecture diagram similar to that described in connection with FIG. 11, the creation of a new session will be discussed. A software application 30 of FIG. 3 interfaces to packet server 34 via any of the well-known and commercially available external software interface 33. During operation, the software applications issues a request 440 to create a new session 433 in session list 430. The request contains a specified end point name to which a connection is desired, and communications related criteria, such as baud rate, max packet size, transfer cost, directionality etc. Packet server 34 issues a request 441 to device manager 36 via internal software interface 400, to examine all prototypes with the designated end point name.

Packet server 34 examines available prototypes and selects prototype 413 as the prototype which has the proper end point name and best meets the criteria specified by the software applications to characterize the communication path. Prototype 413 is tagged as an IN-USE prototype in prototype list 410. Prototype 413 is no longer available for use by other sessions. The communication equipment associated with device manager 36 and selected prototype 413 are allocated and initialized for use by session 433.

Data link 423 is added to data link list 420 indicating an actual connection to the designated end point. Data link 423 also specifies to packet server 34 how to interact with the communications equipment. Thereafter, response 450 is returned to packet server 34 indicating the results of the data link creation.

Packet server 34 adds session 433 to session list 430 and responds 451 to the software application. The software application 30 now has an open communication path, as established by session 433, with which to communicate to its designated end point. Now that the communication path has been set up, each message that is sent or received by the software application does not contain any routing or destination overhead.

Note also that all information to select the best communication path is locally accessed, in device manager's 36 prototype list 410. Thus, the present invention can use existing data communication infrastructure and does not need a central host to control routing and path selection.

FIG. 13 depicts an architecture diagram of a preferred embodiment of the present invention depicting termination of the session created in FIG. 12. When the software application no longer desires to communicate to a designated end point, that session may be deleted. Thus, when session 432 of FIG. 12 is no longer required, software application 30 issues a request 440 to delete session 432 from session list 430.

In response, packet server 34 obtains DATA LINK HANDLE 61 for session 432 and issues request 441 to delete data link 422 from data link list 420. Device manager 36 relinquishes those communication resources associated with data link 422 and marks the STATUS FLAG 54 of prototype 412 as AVAILABLE. Device manager 36 then deletes data link 422 from data link list 420 as shown in FIG. 13.

A response 450 is delivered to packet server 34 indicating the results of the data link deletion. Packet server 34 then deletes session 432 from session list 430 as shown in FIG. 13. Response 451 to delete session request is returned to the software application. The state of the session list, data link list, and prototype list now looks like that shown in FIG. 13.

It will be apparent to those skilled in the art that the present invention anticipates providing data communications capabilities to multiple software applications. It is a first feature of the present invention that each software application may support more than one sessions.

It is second feature of the present invention that any number of device managers 36 and 38 may interface to packet server 34 using the device manager handle 72 provided in the session structure 70. As previously stated, the packet server 34 requests prototypes as a function of the end point name designated by the software application. This request is directed to all device managers interfaced to packet server 34.

It yet another feature of the disclosed invention to support various types of communications media (hardware and networks), including, but not limited to, radio frequency, telephonic, infrared, facsimile, wired Local Area Networks (LANs) and wireless LANs. The present invention is designed with several key coupling points allowing for easy and seamless integration of future communication capabilities. As is well known in the art of device drivers, device specific commands are implemented in the device managers for the various communications hardware. Thus, each communications platform has it's own device manager. Notwithstanding, each software application is insulated from the specific communications media by the packet server. Moreover, the interface between the software application and packet server remains the same, regardless of which program language, communications media or device manager is used. This facilitates development of communications software, including software having a primary purpose other than communications, but that which benefits from communication capability, by creating equivalence between communication systems.

It is an advantage of the present invention to provide a uniform and automated method for software to distinguish between two types of communication systems: those that provide alternative communication paths to some set of remote communication nodes, and those that provide unrelated communication paths to independent sets of remote communication nodes.

Another advantage of the present invention is that it provides, in local memory, a list of possible communications paths for automatic selection by packet server 34 on behalf of a software application 30. The automatic selection is based in part upon destination and further in view of a match between communications criteria defined by the software application and attributes associated with each communications path. Since the communication media selection is done locally, existing communications infrastructure can be used, without the need for modification.

Yet another advantage of the present invention is that it provides automatic selection before data transfer occurs. This greatly reduces message traffic overhead since no routing information is sent prior to messaging.

Still another advantage of the present invention is that it provides a classification scheme for software identification of available alternative (i.e. redundant or "fall-back") communication paths for a subscriber unit.

It will be apparent to those skilled in the art that several modifications can be made to the embodiments disclosed herein without departing from the spirit of the present invention. For instance, a "smart" packet server could be incorporated to allow for real-time roaming between different communication networks.

What is claimed is:

1. A method for selecting one of a plurality of communications path between a subscriber unit and a destination, said subscriber unit comprising memory and a plurality of different communication resources, said method comprising the steps of:
   at said subscriber unit:
   storing in memory a list of communication paths to a plurality of destinations, each of said paths having associated therewith one of said plurality of different communications resources and a set of communication attributes;
   receiving a connection command comprising destination information and a set of communications attributes;
   selecting from said list at least one communications path based at least partly upon the received destination information and the set of received communications attributes; and
   establishing a connection to said selected communications path via one of said plurality of different communication resources.

2. The method of claim 1 further comprising the steps of:
   at said subscriber unit;
   generating a communications command comprising said selected communications path;
   executing said communication command by controllably putting into operation the communication resource associated with the selected communications path;
   publishing a code indicating the success or failure of said communications command; and
   terminating the connection to said selected communications path when communications to said destination is no longer desired.

3. The method of claim 1, wherein the steps of maintaining a list, issuing a connection command, and selecting from said list at least one communications path are performed by the subscriber unit before performing a communications related command.

4. The method of claim 1, wherein said communication resources are selected from the group of devices consisting of: wireline transceivers and wireless transceivers.

5. The method of claim 1, wherein the steps of selecting at least one communications path further comprises the steps of:
   comparing the set of stored communications attributes to the communication attributes as received in the connection command; and
   selecting a communications path based upon the comparison.

6. The method of claim 1 wherein the communication attributes are selected from the group of parameters consisting of: transfer cost, packet size, baud rate, directionality, transit time, and carrier ID.

7. A subscriber unit having memory and a plurality of different communications resources for communicating with a destination point via one of a plurality of communications paths between said subscriber unit and said destination point, and for selecting the communications path for use, said subscriber unit comprising:
   a plurality of device drivers, each coupled to a different communications resource, for storing a list of records describing available communication paths to a destination point, each of said records having associated communication path attributes; and
   a packet server, coupled to the plurality of device drivers, for receiving connection commands comprising a destination point and a plurality of communications attributes and selecting from said device driver lists at least one record, based at least partly upon destination point information and the received communications attributes, that describes the communications path and the one of said plurality of different communications resources for use.

8. The apparatus of claim 7 wherein the subscriber unit is a portable wireless terminal.

9. The apparatus of claim 7 wherein the communications resources are selected from the group of devices consisting of: wireline transceivers and wireless transceivers.

10. The apparatus of claim 9 wherein the communications resources comprise: telephone modems, radio frequency transceivers; infrared transceivers; and fiber-optic transceivers.

11. The apparatus of claim 7 wherein the device drivers and the packet server are software modules stored in memory.

12. The apparatus of claim 7 wherein at least one software application program resides in memory and requests a communications resources in order to communicate with a destination point via one of the plurality of communications paths between the subscriber unit and the destination point.

13. The apparatus of claim 7 wherein the communications attributes are selected from the group of parameters consisting of: transfer cost, packet size, baud rate, directionality, transit time, and carrier ID.

14. The apparatus of claim 7 further comprising:
means for comparing connection command communications attributes with communications path attributes; and
means, coupled to the comparing means, for selecting a communications path based upon the comparison.

15. A method for selecting one of a plurality of communications paths between a subscriber unit and a destination point, the subscriber unit having a device driver, a packet server, a plurality of different communications media and at least one software application, said method comprising the steps of:
at said subscriber unit:
providing a predetermined name associated with said destination point known to said at least one software application and said device driver;
storing in device driver memory a plurality of records describing potential communication paths to said destination point, each of said records having associated therewith one of said plurality of different communications media and a set of communication attributes;
requesting connection to said destination point by sending a request from said at least one software application to said device driver, via said packet server, said request comprising said predetermined name and a second set of communication attributes;
publishing from device driver memory said plurality of records
comparing said published records with said request; and
selecting at said packet server a communications path to said destination point as a function of the comparison.

16. The method of claim 15 further comprising the steps of:
at said subscriber unit;
reserving said communications path for use by said at least one software application by issuing a request from said packet server to said device driver, said request identifying said communications path;
publishing an identification code from said device driver to said packet server as a confirmation of said reservation;
publishing a session number from said packet server to said at least one software application as a confirmation of said reservation;
sending communications commands from said at least one software application to said device driver via said packet server, wherein said commands comprise said session number; and
terminating the connection to said selected communications path when communications to said destination is no longer desired.

17. The method according to claim 16 wherein the step of terminating the connection further comprises the steps of:
relinquishing said communications path by issuing a request from said at least one software application to said device driver via said packet server, said request comprising said session number; and publishing a code from said device driver to said at least one software application via said packet server indicating the success or failure of said termination.

18. A method for selecting a path for data communications between a subscriber unit and an end point, said subscriber unit having a plurality of communications resources, a plurality of device drivers, each device driver having a data link list, a packet server having a session list, and memory, wherein at least one software application requesting data communications to said end point is stored, said method comprising the steps of at said subscriber unit:

a. passing a first request from said at least one software application to said packet server, said first request comprising a first coded value corresponding to said at least one client application's desire to create a new session and a pattern corresponding to the desirable characteristics of said new session, said pattern comprising an end point name component and a criteria component;

b. passing a second request from said packet server to said device manager, said second request comprising a second coded value and said end point name, said second coded value indicating said packet server's desire to examine a prototype list stored in said memory of said subscriber unit;

c. passing a first response from said device manager to said packet server, said first response corresponding to said second request and comprising copies of only said prototypes found in said prototype list which comprise said end point name and a reference number for each copy;

d. selecting exactly one best prototype for further processing from said prototype list upon consideration of said criteria component and said copies of said prototypes from said prototype list;

e. passing a third request to said device manager from said packet server, said third request comprising a third coded value and said reference number corresponding to said one best prototype, said third coded value signifying said packet server's desire to bind to a prototype;

f. said device manager marking said one best prototype as an in-use prototype;

g. said device manager allocating said communication resources using configuration information included in said one best prototype;

h. said device manager initializing said communication resources using said configuration information;

i. said device manager adding a data link to said data link list, said data link comprising said reference number and information describing said communication resources;

j. passing a second response from said device manager to said packet server, said second response corresponding to said third request and comprising a second reference number corresponding to said data link;

k. said packet server adding a session to said session list, said session comprising said second reference number and information describing resources owned by said packet server and used by said session;

l. passing a third response from said packet server to said at least one client application, said third response corresponding to said first request and comprising a third reference number corresponding to said session; and m. retaining knowledge of said third reference number at said at least one client application for use in future requests to said packet server.

19. A method for deleting a path for data communication between a subscriber unit and end point, said subscriber unit having a plurality of communications resources, a plurality of device drivers, each device driver having a data link list, a packet server having a session list, and memory, wherein at least one software application requesting deletion of data communications to said end point is stored, said method comprising the steps of at said subscriber unit:

a. passing a first request from said at least one client application to said packet server, said first request comprising a first coded value indicating said at least one client application's desire to delete a session from said session list and a first reference number corresponding to the session number to be deleted;
   b. said packet server examining said session indicated by said first reference number to obtain a second reference number corresponding to a data link associated with said session;
   c. passing a second request from said packet server to said device manager, said second request comprising a second coded value indicating said packet server's desire to delete said data link corresponding to said second reference number;
   d. said device manager examining said data link indicated by said second reference number and relinquishing said communication resources described in said data link;
   e. said device manager examining said data link indicated by said second reference number to obtain a third reference number corresponding to an IN-USE prototype associated with said data link;
   f. said device manager marking said IN-USE prototype as indicated by said third reference number as an AVAILABLE prototype;
   g. said device manager deleting said data link indicated by said second reference number;
   h. passing a first response from said device manager to said packet server, said first response indicating results of data link deletion and corresponding to said second request;
   i. said packet server releasing said communication resources owned by said packet server used by said session;
   j. said packet server deleting said session from said session list;
   k. passing a second response from said packet server to said at least one client application, said second response indicating results of session deletion and corresponding to said first request; and
   l. said at least one client application forgetting knowledge of said first reference number of said first request, and forgoing its use in future requests to said packet server.

* * * * *